(12) United States Patent
Kaidu et al.

(10) Patent No.: US 11,539,321 B2
(45) Date of Patent: Dec. 27, 2022

(54) MOTOR CONTROL CIRCUIT, MOTOR DRIVE CONTROL DEVICE, AND MOTOR UNIT

(71) Applicant: MINEBEA MITSUMI Inc., Nagano (JP)

(72) Inventors: Hiroyuki Kaidu, Kakegawa (JP); Masato Aoki, Iwata (JP); Takahiro Suzuki, Fukuroi (JP); Tomotaka Sakuma, Nagano (JP); Yoshihisa Okabuchi, Sapporo (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/470,267

(22) Filed: Sep. 9, 2021

(65) Prior Publication Data

US 2022/0094292 A1    Mar. 24, 2022

(30) Foreign Application Priority Data

Sep. 23, 2020   (JP) .............................. JP2020-158823

(51) Int. Cl.
   *H02P 27/08*   (2006.01)
(52) U.S. Cl.
   CPC .................................. *H02P 27/08* (2013.01)
(58) Field of Classification Search
   CPC ...... H02P 1/00; H02P 1/04; H02P 1/16; H02P 1/18; H02P 1/24; H02P 1/26; H02P 1/265; H02P 1/42; H02P 1/46; H02P 1/465; H02P 1/52; H02P 3/00; H02P 3/24; H02P 5/00; H02P 6/00; H02P 6/005; H02P 6/06; H02P 6/08; H02P 6/12; H02P 6/14; H02P 6/17; H02P 6/181; H02P 6/32; H02P 7/00; H02P 7/2451; H02P 7/265; H02P 7/29; H02P 21/00; H02P 21/18; H02P 21/14; H02P 23/00; H02P 23/14; H02P 25/00; H02P 25/03; H02P 25/062; H02P 25/064; H02P 27/00; H02P 27/04; H02P 27/06; H02P 27/08; H02P 27/085; H02P 27/026
   See application file for complete search history.

(56) References Cited

U.S. PATENT DOCUMENTS

2016/0352279 A1*  12/2016  Mishima ................... H02P 6/16

FOREIGN PATENT DOCUMENTS

| JP | 2010-283908 A | 12/2010 |
|----|---------------|---------|
| JP | 2016-226263 A | 12/2016 |

* cited by examiner

*Primary Examiner* — Antony M Paul
(74) *Attorney, Agent, or Firm* — Pearne & Gordon LLP

(57) ABSTRACT

The degree of flexibility of a speed curve for a target rotational speed of a motor is to be increased. A motor control circuit 11 measures a duty cycle of an input speed command signal Sc indicating a target rotational speed of a motor 50 to be driven, sets an inflection point In for each duty cycle obtained by equally dividing a possible duty cycle range assumed by the speed command signal Sc based on resolution information 301 indicating a resolution of the duty cycle of the speed command signal Sc, calculates a rotational speed corresponding to the measured duty cycle of the speed command signal Sc based on rotational speed information 302 indicating rotational speeds at the inflection points In on a speed curve and the set inflection points In, and determines the calculated rotational speed as the target rotational speed.

9 Claims, 10 Drawing Sheets

| SPEED COMMAND | | LINEAR INTERPOLATION POINT NUMBER $q(=2^n-1)$ | INFLECTION POINT | |
|---|---|---|---|---|
| SPEED COMMAND NUMBER (ARRAY NUMBER) p (SECOND RESOLUTION) | UNITARY DUTY CYCLE | | INFLECTION POINT NUMBER (ARRAY NUMBER) m (FIRST RESOLUTION) | DUTY CYCLE BETWEEN INFLECTION POINTS |
| 256 | 0.391 | $1(=2^1-1)$ | 128 | 0.78 |
| | | $3(=2^2-1)$ | 64 | 1.56 |
| | | $7(=2^3-1)$ | 32 | 3.13 |
| | | $15(=2^4-1)$ | 16 | 6.25 |
| 400 | 0.25 | $1(=2^1-1)$ | 200 | 0.50 |
| | | $3(=2^2-1)$ | 100 | 1.00 |
| | | $7(=2^3-1)$ | 50 | 2.00 |
| | | $15(=2^4-1)$ | 25 | 4.00 |
| 512 | 0.195 | $1(=2^1-1)$ | 256 | 0.39 |
| | | $3(=2^2-1)$ | 128 | 0.78 |
| | | $7(=2^3-1)$ | 64 | 1.56 |
| | | $15(=2^4-1)$ | 32 | 3.13 |

FIG.7

| DUTY CYCLE OF SPEED COMMAND SIGNAL Sc[%] | INFLECTION POINT | SEQUENCE NUMBER m OF INFLECTION POINT In | ROTATIONAL SPEED AT INFLECTION POINT In [rpm] | SEQUENCE NUMBER p OF SPEED COMMAND | REMINDER OBTAINED BY DIVIDING SEQUENCE NUMBER p BY 8 (= LINEAR INTERPOLATION POINT NUMBER + 1) | ROTATIONAL SPEED AT IMMEDIATELY SUBSEQUENT INFLECTION POINT [rpm] | ROTATIONAL SPEED AT IMMEDIATELY PRIOR INFLECTION POINT [rpm] | TARGET ROTATIONAL SPEED [rpm] |
|---|---|---|---|---|---|---|---|---|
| 0 | ○ | 0 | 0 | 0 | 0 | 0 | 0 | 0 |
| 0.25 | | | | 1 | 1 | 800 | 0 | 100 |
| 0.5 | | | | 2 | 2 | 800 | 0 | 200 |
| 0.75 | | | | 3 | 3 | 800 | 0 | 300 |
| 1 | | | | 4 | 4 | 800 | 0 | 400 |
| 1.25 | | | | 5 | 5 | 800 | 0 | 500 |
| 1.5 | | | | 6 | 6 | 800 | 0 | 600 |
| 1.75 | | | | 7 | 7 | 800 | 0 | 700 |
| 2 | ○ | 1 | 800 | 8 | 0 | 800 | 800 | 800 |
| 2.25 | | | | 9 | 1 | 1200 | 800 | 850 |
| 2.5 | | | | 10 | 2 | 1200 | 800 | 900 |
| 2.75 | | | | 11 | 3 | 1200 | 800 | 950 |
| 3 | | | | 12 | 4 | 1200 | 800 | 1000 |
| 3.25 | | | | 13 | 5 | 1200 | 800 | 1050 |
| 3.5 | | | | 14 | 6 | 1200 | 800 | 1100 |
| 3.75 | | | | 15 | 7 | 1200 | 800 | 1150 |
| 4 | ○ | 2 | 1200 | 16 | 0 | 1200 | 1200 | 1200 |
| 4.25 | | | | 17 | 1 | 1520 | 1200 | 1240 |
| 4.5 | | | | 18 | 2 | 1520 | 1200 | 1280 |
| 4.75 | | | | 19 | 3 | 1520 | 1200 | 1320 |
| 5 | | | | 20 | 4 | 1520 | 1200 | 1360 |
| 5.25 | | | | 21 | 5 | 1520 | 1200 | 1400 |
| 5.5 | | | | 22 | 6 | 1520 | 1200 | 1440 |
| 5.75 | | | | 23 | 7 | 1520 | 1200 | 1480 |
| 6 | ○ | 3 | 1520 | 24 | 0 | 1520 | 1520 | 1520 |
| ... | ... | ... | ... | ... | ... | ... | ... | ... |
| 100 | ○ | 50 | 32000 | 400 | 0 | 32000 | 32000 | 32000 |

MOTOR CONTROL CIRCUIT, MOTOR DRIVE CONTROL DEVICE, AND MOTOR UNIT

CROSS REFERENCE TO RELATED APPLICATIONS

This application claims the benefit of Japanese Patent Application No. 2020-158823, filed Sep. 23, 2020, which is hereby incorporated by reference in its entirety.

BACKGROUND

Technical Field

The present disclosure relates to a motor control circuit, a motor drive control device, a motor unit, and a motor control method.

Background

Conventionally, a motor control circuit has been known that controls the rotational speed of a motor according to a speed command signal input from an external device such as a host device. For example, for a fan motor or the like, it has been well known that a signal subjected to pulse width modulation (PWM) (hereinafter also referred to simply as a "PWM signal"), having a duty cycle corresponding to a target rotational speed of the motor, is used as a speed command signal.

For example, Japanese Patent Laid-Open No. 2010-283908 and Japanese Patent Laid-Open No. 2016-226263 disclose a motor drive control device that, when a PWM signal as a speed command signal is input from a host device, measures the duty cycle of the PWM signal, calculates a target rotational speed based on the measured duty cycle, and controls the motor such that the motor rotates at the target rotational speed.

In recent years, an integrated circuit as a motor control circuit (hereinafter also referred to as a "driver IC") has been known in which parameters of a function (hereinafter also referred to as a "speed curve") stored in a non-volatile memory. The function represents the relationship between the duty cycle of a speed command signal and a target rotational speed (target rotational rate) of the motor. The parameters of the function can be changed. With this driver IC, it is possible to change the above-mentioned function according to the application to which the motor is applied by changing the above-mentioned parameter written in the non-volatile memory in the integrated circuit from an information processing terminal such as a personal computer (PC).

However, for the conventional driver IC, the settable speed curve is restricted due to restrictions on the capacity of the mountable non-volatile memory, prevention of reduction in the processing speed, and the like. With the conventional driver IC, it is only possible to set a limited speed curve such as a line graph connecting several points, e.g., four points, with straight lines, and it is impossible to set a speed curve with a high degree of flexibility.

The present disclosure is related to increasing the degree of flexibility of a speed curve for a target rotational speed of a motor in drive control of the motor.

SUMMARY

A motor control circuit includes: a speed command analyzing unit measuring a duty cycle of an input speed command signal indicating a target rotational speed of a motor to be driven; a storage unit storing parameter information for defining a speed curve indicating a relationship between the duty cycle of the speed command signal and the target rotational speed; a target rotational speed determining unit determining the target rotational speed based on the parameter information stored in the storage unit and a result of measurement of the duty cycle of the speed command signal by the speed command analyzing unit; and a drive control signal generating unit generating a drive control signal for controlling driving of the motor based on the target rotational speed determined by the target rotational speed determining unit, wherein the parameter information includes resolution information indicating a resolution of the duty cycle of the speed command signal and rotational speed information indicating a rotational speed at an inflection point on the speed curve, and the target rotational speed determining unit sets the inflection point for each duty cycle obtained by equally dividing a possible duty cycle range assumed by the speed command signal based on the resolution information, calculates a rotational speed corresponding to the duty cycle of the speed command signal measured by the speed command analyzing unit based on the set inflection point and the rotational speed information, and determines the calculated rotational speed as the target rotational speed.

According to an aspect of the present disclosure, it is possible to increase the degree of flexibility of setting a speed curve for a target rotational speed of a motor in drive control of the motor.

BRIEF DESCRIPTION OF THE DRAWINGS

FIG. 7 is a table showing an example of the mutual relationship between a speed command number, a linear interpolation point number, and an inflection point number;

FIG. 8 is a table for illustrating a method of calculating a target rotational speed by a motor control circuit according to embodiment 2.

DETAILED DESCRIPTION

1. Outline of Embodiments

Figure 1:
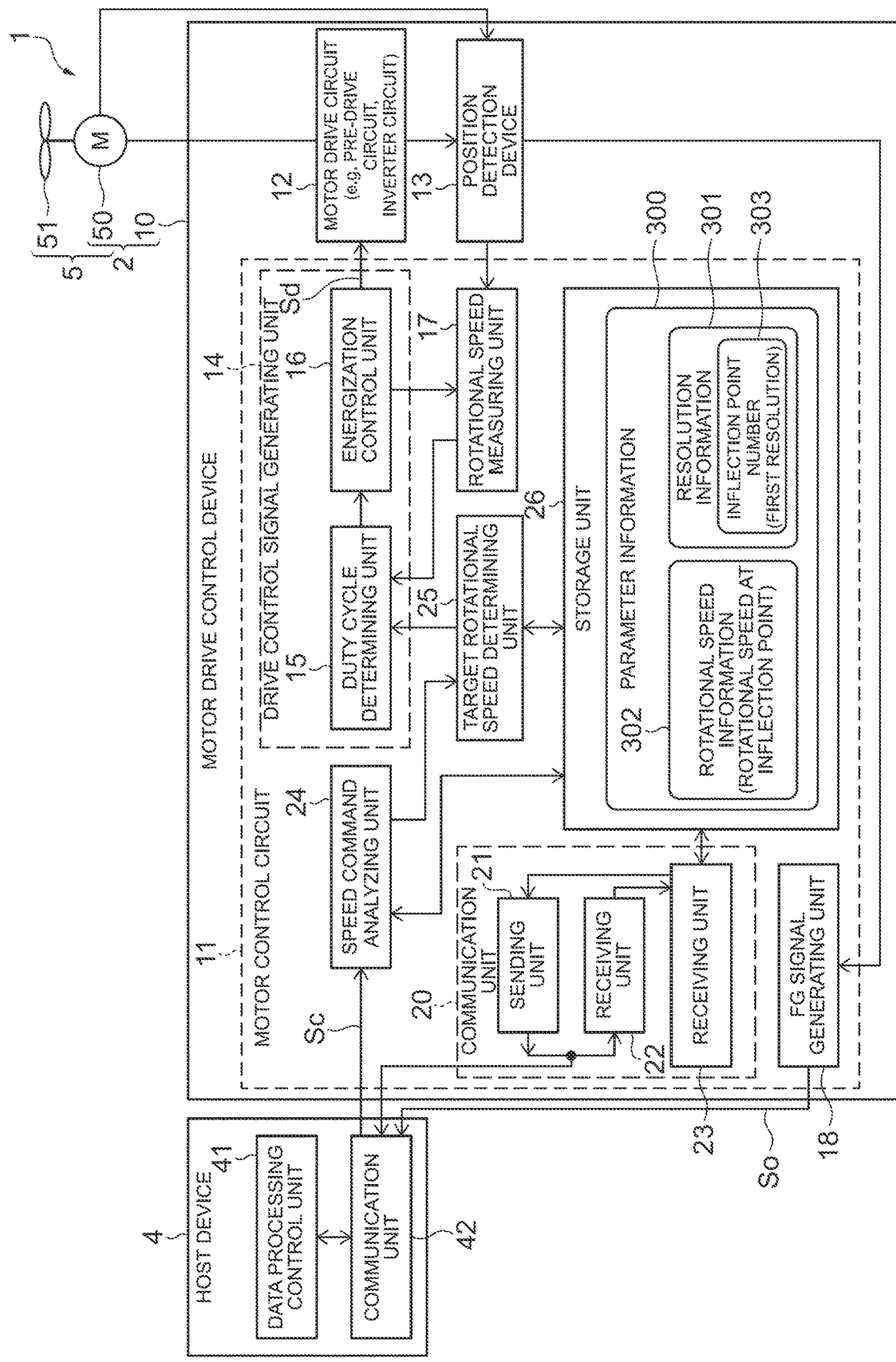
FIG. 1 is a diagram showing an example of the configuration of a motor drive control device according to embodiment 1.

First, an outline of representative embodiments of the disclosure disclosed in the present application will be described. Note that, in the following description, parentheses are given to reference characters in the drawings corresponding to components of the disclosure.

[1] A motor control circuit (11, 11A) according to a representative embodiment of the present disclosure includes: a speed command analyzing unit (24, 24A) measuring a duty cycle of an input speed command signal (Sc) indicating a target rotational speed of a motor (50) to be driven; a storage unit (26, 26A) storing parameter information (300, 300A) for defining a speed curve (201, 203) indicating the relationship between the duty cycle of the speed command signal and the target rotational speed; a target rotational speed determining unit (25, 25A) determining the target rotational speed based on the parameter information stored in the storage unit and a result of measurement of the duty cycle of the speed command signal by the speed command analyzing unit; and a drive control signal generating unit (14) generating a drive control signal (Sd) for controlling driving of the motor based on the target rotational speed determined by the target rotational speed determining unit, and is characterized in that the parameter information includes resolution information (301, 301A) indicating a resolution of the duty cycle of the speed command signal and rotational speed information (302) indicating a rotational speed at an inflection point (In) on the speed curve, and the target rotational speed determining unit sets the inflection point for each duty cycle obtained by equally dividing a possible duty cycle range assumed by the speed command signal based on the resolution information, calculates a rotational speed corresponding to the duty cycle of the speed command signal measured by the speed command analyzing unit based on the set inflection point and the rotational speed information, and determines the calculated rotational speed as the target rotational speed.

[2] In the motor control circuit (11) according to [1] above, the storage unit may be configured to be capable of rewriting the parameter information.

[3] In the motor control circuit (11) according to [1] or [2] above, the resolution information may include information (303) on a number of inflection points provided at constant intervals on the speed curve, the speed command analyzing unit (24) may measure the duty cycle of the speed command signal with a resolution based on the number of inflection points, and the target rotational speed determining unit (25) may identify an inflection point (In(k)) corresponding to the duty cycle of the speed command signal measured by the speed command analyzing unit from among the set inflection points, calculate a rotational speed at the identified inflection point based on the rotational speed information, and determine the calculated rotational speed as the target rotational speed.

[4] In the motor control circuit (11A) according [1] or [2] above, the resolution information (301A) may include at least two pieces of information (303) on a number of inflection points as a first resolution of the duty cycle of the speed command signal, information (304) on a speed command number as a second resolution of the duty cycle of the speed command signal, the second resolution being higher than the first resolution, and information (305) on a number of linear interpolation points provided at constant intervals between the adjacent inflection points for interpolation between the inflection points with straight lines, the target rotational speed determining unit (25A) may set the inflection point for each duty cycle obtained by equally dividing a possible duty cycle range assumed by the speed command signal based on the number of inflection points and set a speed command sequence number (p) for each duty cycle obtained by equally dividing the possible duty cycle range assumed by the speed command signal based on the speed command number, and identify the speed command sequence number (j) corresponding to the duty cycle of the speed command signal measured by the speed command analyzing unit (24A) from among the set speed command sequence numbers, and the target rotational speed determining unit (25A) may calculate an increase in rotational speed between the linear interpolation points present between the inflection point immediately prior to the identified speed command sequence number (j) and the inflection point immediately subsequent to the identified speed command sequence number (j) based on a difference |Rh−Rl| between a rotational speed (Rl) at the immediately prior inflection point and a rotational speed (Rh) at the immediately subsequent inflection point, calculate a rotational speed corresponding to the identified speed command sequence number based on a value of the calculated increase in rotational speed between the linear interpolation points and a number (q) of the linear interpolation points, and determine the calculated rotational speed as the target rotational speed.

[5] In the motor control circuit according to [4] above, the target rotational speed determining unit (25A) may multiply, by the increase (|Rh−Rl|) in rotational speed between the linear interpolation points, a value (r) of a remainder obtained by dividing the identified speed command sequence number (j) by a number ($2^n$) equal to the number of linear interpolation points (q) plus 1, add the rotational speed (Rl) at the immediately prior inflection point to the value (r×|Rh−Rl|) obtained by the multiplication, and determine the value obtained by the addition as the target rotational speed.

[6] In the motor control circuit according to [4] or [5] above, when n is defined as an integer larger than or equal to 1, the number of linear interpolation points may be ($2^n-1$).

[7] In the motor control circuit according to any one of [4] to [6] above, the target rotational speed determining unit (25A) may calculate the number of linear interpolation points based on the information (303) on the number of inflection points and the information (304) on the speed command number.

[8] A motor drive control device (10, 10A) according to a representative embodiment of the present disclosure is characterized by including: the motor control circuit (11, 11A) according to any one of [1] to [7] above; and a motor drive circuit (12) driving the motor based on the drive control signal generated by the motor control circuit.

[9] A motor unit (2, 2A) according to a representative embodiment of the present disclosure may include: the motor drive control device (10, 10A) according to [8] above; and the motor (50) driven by the motor drive control device.

[10] A motor control method according to a representative embodiment of the present disclosure is a method of controlling a motor (50) by a motor control circuit including a storage unit storing parameter information for defining a speed curve indicating a relationship between a duty cycle of a speed command signal indicating a target rotational speed of a motor to be driven and the target rotational speed. The motor control method includes: a first step (S13, S24) of measuring the duty cycle of the input speed command signal; a second step (S11, S14 to S16, S21, S22, S25 to S34) of determining the target rotational speed based on the parameter information stored in the storage unit and the duty cycle of the speed command signal measured in the first step; and a third step of generating a drive control signal for controlling driving of the motor based on the target rotational speed determined in the second step. The parameter information includes resolution information indicating a resolution of the duty cycle of the speed command signal and rotational speed information indicating a rotational speed at an inflection point on the speed curve, and the second step is characterized by including a step of setting the inflection point for each duty cycle obtained by equally dividing a possible duty cycle range assumed by the speed command signal based on the resolution information, calculating a rotational speed corresponding to the duty cycle of the speed command signal measured in the first step based on the set inflection point and the rotational speed information, and determining the calculated rotational speed as the target rotational speed.

2. Specific Examples of Embodiments

Hereinafter, specific examples of the embodiments of the present disclosure will be described with reference to the drawings. Note that, in the following description, the same reference characters are given to components common to embodiments, and repeated descriptions will be omitted.

Embodiment 1

FIG. 1 is a diagram showing an example of the configuration of a motor drive control device 10 according to embodiment 1.

The motor drive control device 10 shown in FIG. 1 is a device for controlling the driving of a motor 50 to be driven. The motor 50 is, for example, a three-phase brushless motor. Note that the type of the motor 50 is not particularly limited, and also the number of phases is not limited to three phases. For example, an impeller (bladed wheel) 51 is connected to an output shaft of the motor 50.

The impeller 51 is a component for generating airflow, and is configured to be rotatable by rotational force of the motor 50. For example, a rotation shaft of the impeller 51 is connected coaxially to the output shaft of the motor 50.

In the present embodiment, for example, the impeller 51 and the motor 50 forms one fan (fan motor) 5. In addition, the motor 50 and the motor drive control device 10 forms one motor unit 2, and the fan 5 and the motor drive control device 10 forms one fan unit 1. For example, the fan unit 1 is arranged in a closed space in a server and forms a cooling system for cooling various electronic components and the like forming the server. The fan unit 1 operates based on various commands from a host device 4.

The host device 4 is a control device for controlling the driving of the fan unit 1. For example, if the fan unit 1 forms a cooling system for a server, the host device 4 is a program processing device for realizing a main function as the server.

For example, the host device 4 is realized by a program processing device (e.g., a microcontroller) having a configuration in which a processor such as a CPU, various storage devices such as a RAM and a ROM, and peripheral circuits such as a counter (timer), an A/D conversion circuit, a D/A conversion circuit, a clock generating circuit, and input/output I/F circuits are connected to each other via a bus or a dedicated line, housed together with the fan unit 1 in one housing.

For example, the host device 4 controls the fan 5 such that the amount of airflow from the fan (motor) becomes appropriate according to environmental changes (such as changes in the processing load and changes in the internal temperature of the server).

As shown in FIG. 1, for example, the host device 4 includes a data processing control unit 41 for realizing a main function as a server and a communication unit 42 for performing communication with the fan unit 1. For example, the data processing control unit 41 and the communication unit 42 are realized by the processor performing various computation processes according to a program stored in the memory and controlling peripheral circuits such as the counter and the A/D conversion circuit in the program processing device forming the host device 4.

The data processing control unit 41 sends a speed command signal Sc indicating a rotational speed to be targeted by the motor 50 of the fan 5 (a target rotational speed) to the fan unit 1 via the communication unit 42 in order to adjust the amount of airflow supplied from the fan 5 arranged in the server, for example.

The speed command signal Sc is, for example, a PWM signal having a duty cycle according to the target rotational speed specified. Sending/receiving of the speed command signal Sc is realized by using a dedicated line connecting the host device 4 and the fan unit 1, for example.

The data processing control unit 41 also monitors the rotation state of the motor 50 of the fan unit 1 by receiving, via the communication unit 42, a rotational speed signal So (e.g., an FG (Frequency Generator) signal) representing the actual rotational speed (rotational rate) of the motor 50 output from the fan unit 1. Sending/receiving of the rotational speed signal So is realized by using a dedicated line connecting the host device 4 and the fan unit 1, for example.

Further, the data processing control unit 41 sends/receives various pieces of data to/from the fan unit 1 via the communication unit 42. For example, the data processing control unit 41 accesses the fan unit 1 via the communication unit 42 to write parameter information 300, which will be described later, into a motor control circuit 11 and rewrite the parameter information 300 stored in the motor control circuit 11. In this case, communication between the host device 4 (the communication unit 42) and the fan unit 1 (the motor drive control device 10) is realized by serial communication, for example. Note that the communication between the fan unit 1 and the host device 4 may be wired communication or wireless communication, and the communication scheme is not particularly limited.

The motor drive control device 10 generates a drive control signal Sd according to a speed command (speed command signal Sc) from the host device 4 and periodically causes sine-wave driving current to flow each phase (e.g., three-phase) coil of the motor 50 to rotate the motor 50. The motor drive control device 10 includes the motor control circuit 11, a motor drive circuit 12, and a position detection device 13.

The position detection device 13 is a device for detecting the rotational position of the rotor of the motor 50, and is, for example, a Hall device. The position detection device 13 outputs a position detection signal (Hall signal) according to the position of the rotor of the motor 50.

The motor control circuit 11 controls the driving of the motor 50 based on the speed command from the host device 4 and the position detection signal from the position detection device 13. Specifically, the motor control circuit 11 measures the rotational speed of the motor 50 based on the position detection signal from the position detection device 13, and generates a drive control signal Sd such that the rotational speed coincides with the target rotational speed specified by the speed command signal Sc input from the outside (the host device 4). The drive control signal Sd is, for example, a PWM (Pulse Width Modulation) signal. Note that the details of the motor control circuit 11 will be described later.

The motor drive circuit 12 drives the motor 50 based on the drive control signal Sd generated by the motor control circuit 11. For example, the motor drive circuit 12 includes an inverter circuit and a pre-drive circuit (not shown).

The inverter circuit outputs a driving signal to the motor 50 based on an output signal output from the pre-drive circuit and energizes the coils provided to the motor 50. For example, the inverter circuit has a configuration in which a series-circuit pair of two switching devices provided across a DC power supply are arranged for each phase coil. For each pair of two switching devices, each phase terminal of the motor 50 is connected at the connecting point of the switching devices.

The pre-drive circuit generates an output signal for driving the inverter circuit based on the drive control signal Sd and outputs it to the inverter circuit. For example, the pre-drive circuit generates and outputs a driving signal for driving each switching device of the inverter circuit based on the drive control signal Sd. This driving signal turns on/off each switching device forming the inverter circuit, so that electric power is supplied to each phase of the motor 50, and the rotor of the motor 50 rotates.

The motor control circuit 11 will be described in detail below.

For example, the motor control circuit 11 is realized by a program processing device (e.g., a microcontroller) having a configuration in which a processor such as a CPU, various storage devices such as a RAM, a ROM and a flash memory, and peripheral circuits such as a counter (timer), an A/D conversion circuit, a D/A conversion circuit, a clock generating circuit, and input/output I/F circuits are connected to each other via a bus or a dedicated line.

Note that the motor control circuit 11 and the motor drive circuit 12 may each be separately packaged as an individual integrated circuit device (IC) or may be packaged as a single integrated circuit device (IC).

As described above, the motor control circuit 11 generates a drive control signal Sd such that the rotational speed of the motor 50 coincides with the target rotational speed specified by the speed command signal Sc. At this time, the motor control circuit 11 analyzes the PWM signal as the speed command signal Sc input from the outside to measure the duty cycle of the speed command signal Sc. The motor control circuit 11 calculates the target rotational speed corresponding to the measured duty cycle of the speed command signal Sc by using parameter information 300 for defining a speed curve indicating the relationship between the duty cycle of the speed command signal Sc and the target rotational speed, stored in advance in a storage device in the motor control circuit 11.

The motor control circuit 11 includes, for example, a drive control signal generating unit 14, a rotational speed measuring unit 17, an FG signal generating unit 18, a communication unit 20, a speed command analyzing unit 24, a target rotational speed determining unit 25, and a storage unit 26 as functional blocks for realizing functions related to the drive control of the motor 50 described above. For example, these functional units are realized by the CPU performing various computation processes according to a program stored in the memory and controlling peripheral circuits based on the processing results in the program processing device described above.

Hereinafter, each functional unit of the motor control circuit 11 will be described in detail.

The drive control signal generating unit 14 is a functional unit for generating a drive control signal Sd. For example, when receiving a speed command signal Sc output from the host device 4, the drive control signal generating unit 14 generates a drive control signal Sd such that a target rotational speed calculated by the target rotational speed determining unit 25, which will be described later, based on the speed command signal Sc and the actual rotational speed of the motor 50 coincide.

As shown in FIG. 1, the drive control signal generating unit 14 includes, for example, a duty cycle determining unit 15 and an energization control unit 16. The duty cycle determining unit 15 determines the duty cycle of the PWM signal as the drive control signal Sd based on the target rotational speed output from the target rotational speed determining unit 25 and a measured value of the rotational speed of the motor 50 measured by the rotational speed measuring unit 17, which will be described later. For example, the duty cycle determining unit 15 calculates a control amount of the motor 50 such that the difference between the target rotational speed and the measured value of the rotational speed of the motor 50 decreases, and determines the duty cycle of the PWM signal according to the control amount. The energization control unit 16 generates a PWM signal having the duty cycle determined by the duty cycle determining unit 15 and outputs it as a drive control signal Sd.

The rotational speed measuring unit 17 is a functional unit for measuring the rotational speed of the motor 50. For example, the rotational speed measuring unit 17 measures the rotational speed of the motor 50 based on a position detection signal output from the position detection device 13 (e.g., a Hall device) and outputs the measurement result.

The FG signal generating unit 18 generates an FG signal as a rotational speed signal So indicating the rotational speed of the motor 50. For example, the FG signal generating unit 18 generates and outputs a signal (FG signal) having a period (frequency) proportional to the rotational speed of the motor 50 based on the position detection signal output from the position detection device 13. The FG signal output from the FG signal generating unit 18 is input to the host device 4 as the rotational speed signal So.

Note that the FG signal generating unit 18 may be realized by an FG pattern formed on a board (printed circuit board) on which the motor 50 is mounted, for example.

The communication unit 20 is a functional unit for performing communication with the outside. For example, the communication unit 20 sends/receives data to/from the host device 4 as an external device. The communication unit 20 includes a sending unit 21, a receiving unit 22, and a communication control unit 23.

The sending unit 21 sends signals to the outside (e.g., an external device such as the host device 4). The receiving unit 22 receives signals from the outside (e.g., an external device such as the host device 4). For example, the sending unit 21 and the receiving unit 22 are serial communication interface circuits that are controlled by the communication control unit 23 to generate and send predetermined serial signals to a communication line and receive serial signals from the communication line.

The communication control unit 23 sends encoded data to the sending unit 21 and decodes data received by the receiving unit 22 to realize the sending/receiving of data to/from the host device 4. For example, the communication control unit 23 is realized by program processing by a processor forming the motor drive control device 10 described above.

The communication control unit 23 also stores data sent from an external device such as the host device 4 in the storage unit 26. For example, when a write request for parameter information 300, which will be described later, and data for the parameter information 300 to be written are sent from the host device 4, the communication control unit 23 causes the storage unit 26 to store the parameter information 300 received by the receiving unit 22. Thereafter, the communication control unit 23 sends, as a response to the above-mentioned write request, data indicating that the writing of the parameter information 300 is completed from the sending unit 21 to the host device 4 (the communication unit 42).

In the motor control circuit 11 according to embodiment 1, the target rotational speed of the motor 50 is calculated based on the speed command signal Sc input from the host device 4 or the like and the parameter information 300 for defining the speed curve indicating the relationship between the duty cycle of the speed command signal Sc and the target rotational speed. Specifically, the motor control circuit 11 presets the number of inflection points on the speed curve to be set in a possible duty cycle range (e.g., 0% to 100%) assumed by the speed command signal Sc and rotational speeds at the respective inflection points, measures the duty cycle of the input speed command signal Sc with a resolution based on the number of inflection points, and determines the target rotational speed of the motor 50 based on the rotational speed at the inflection point corresponding to the measurement result of the duty cycle of the speed command signal Sc.

Here, the inflection point is a point in a two-dimensional orthogonal coordinate system for defining a certain speed curve, consisting of the duty cycle of the speed command signal Sc and the rotational speed of the motor. By setting inflection points, it is possible to arbitrarily set the slope of the speed curve. As will be described later, in the present embodiment, while rotational speed values at the respective inflection points are preset, duty cycle values of the speed command signal Sc at the respective inflection points are determined by a resolution based on the number of inflection points set.

Hereinafter, the method of determining the target rotational speed by the motor control circuit 11 will be described in detail.

Figure 2A:
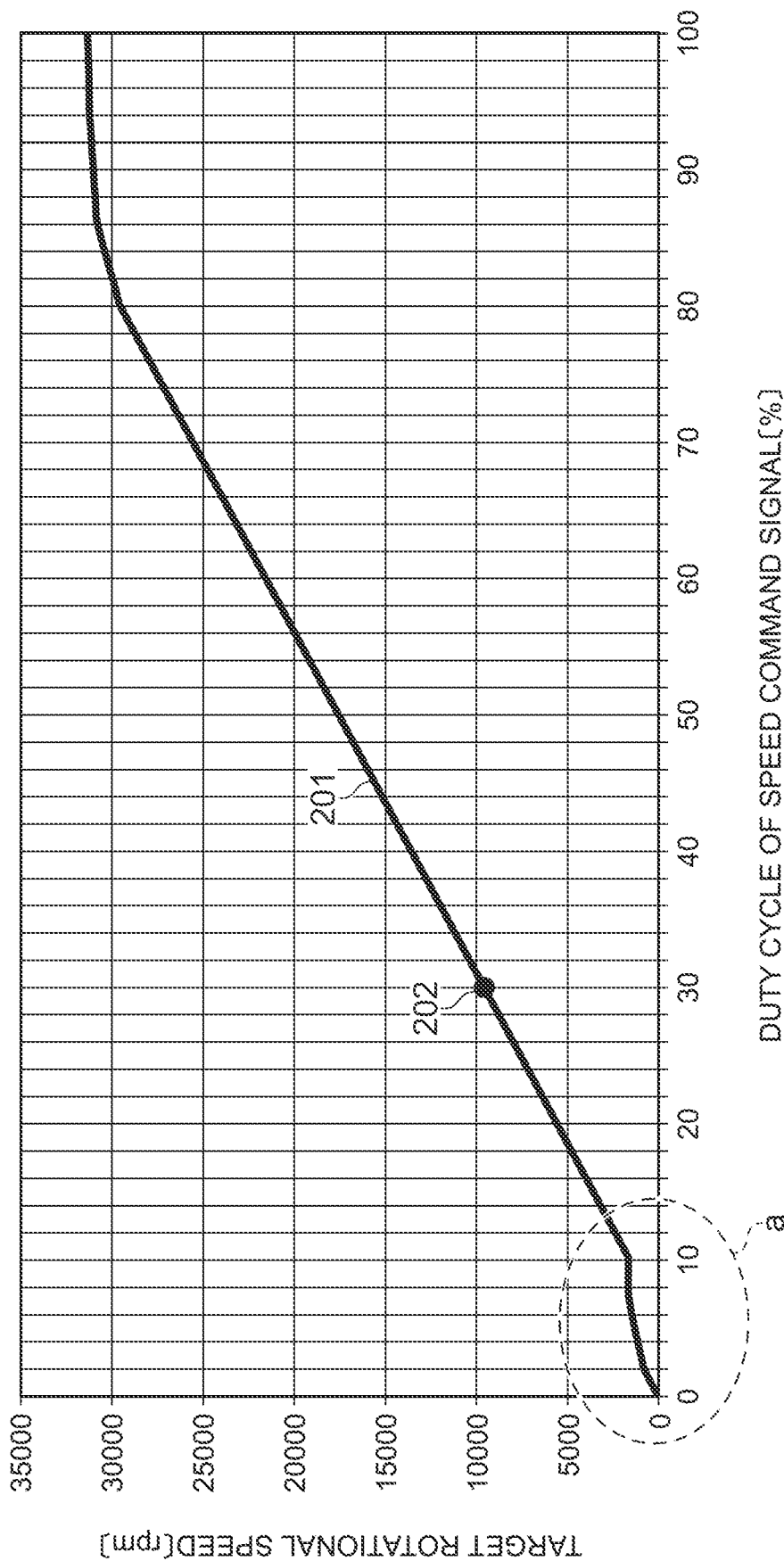
FIG. 2A is a graph showing an example of a speed curve indicating the relationship between the duty cycle of a speed command signal Sc and a target rotational speed according to embodiment 1.
Figure 2B:
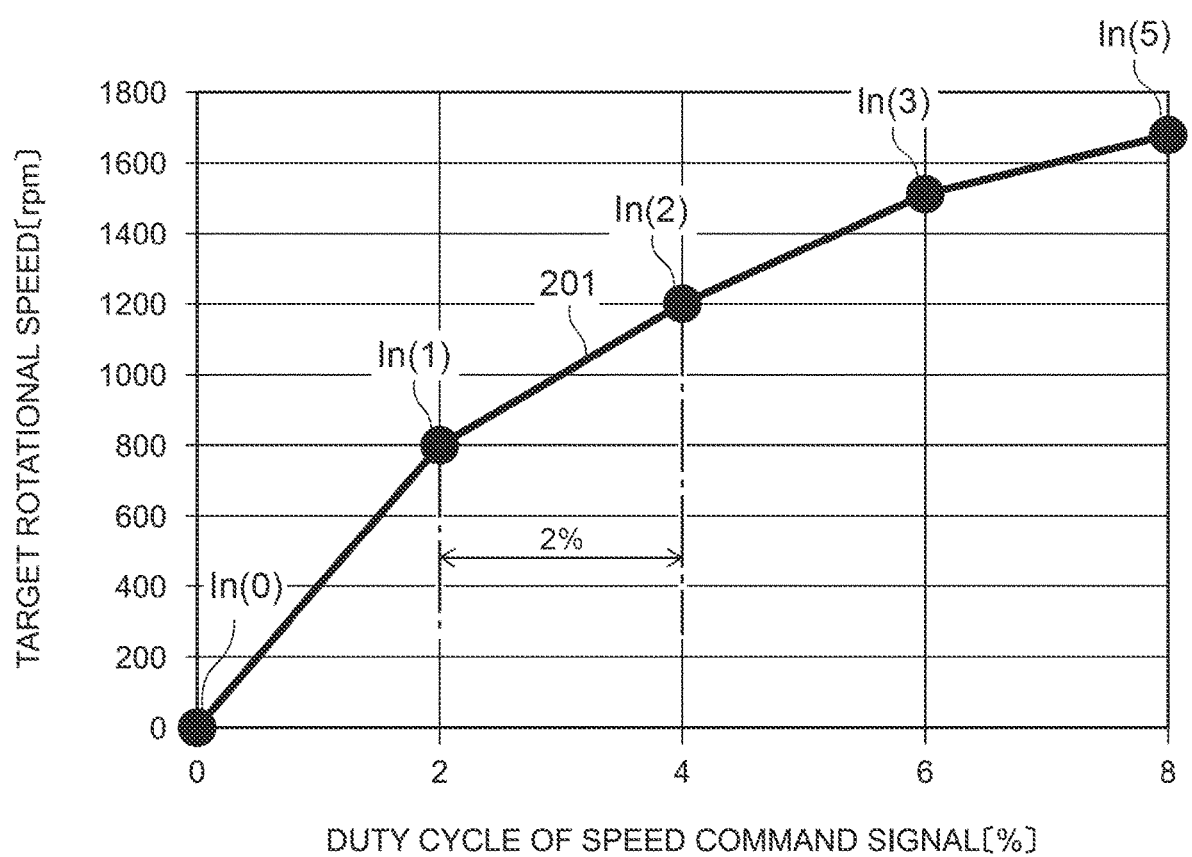
FIG. 2B is an enlarged view of a region a of the speed curve shown in FIG. 2A.

FIG. 2A is a graph showing an example of a speed curve indicating the relationship between the duty cycle of the speed command signal Sc and the target rotational speed according to embodiment 1. FIG. 2B is an enlarged view of a region a of a speed curve 201 shown in FIG. 2A. In FIGS. 2A and 2B, the vertical axis represents the target rotational speed [rpm], and the horizontal axis represents the duty cycle [%] of the speed command signal Sc.

The speed curve 201 shown in FIGS. 2A and 2B is a graph representing the correspondence between the duty cycle and the target rotational speed (target rotational rate) of the motor 50 in a possible duty cycle range (e.g., 0% to 100%) assumed by the PWM signal as the speed command signal Sc. The speed curve 201 is set such that the number of inflection points is "50" and the rate (slope) of change in the rotational speed relative to the duty cycle changes in a section where the duty cycle is between 0% and 10% and a section where the duty cycle is between 80% and 100%.

For example, if the inflection point number (number of inflection points) m (m is an integer larger than or equal to 1) is "50", as shown in FIG. 2B, an inflection point In is set for each 2% (=(100%−0%)/50), and a certain rotational speed is set for each inflection point In. For example, a rotational speed of "800" is set for inflection point In(1), and a rotational speed of "1200" is set for inflection point In(2).

The motor control circuit 11 according to embodiment 1 stores in advance information on the inflection point number m and information on rotational speeds at the respective inflection points as parameter information 300 in the storage device, and calculates the target rotational speed of the motor 50 based on the stored parameter information 300 and the duty cycle of the speed command signal Sc analyzed with a resolution based on the inflection point number m. Specifically, the motor control circuit 11 includes the speed command analyzing unit 24, the storage unit 26, and the target rotational speed determining unit 25 as functional units for determining the target rotational speed of the motor 50.

The storage unit 26 is a functional unit for storing the parameter information 300 required for calculating the target rotational speed of the motor 50 based on the speed command signal Sc.

The parameter information 300 is data for defining a speed curve indicating the relationship between the duty cycle of the speed command signal Sc and the target rotational speed. Specifically, the parameter information 300 includes resolution information 301 and rotational speed information 302.

The resolution information 301 is information indicating the resolution of the duty cycle of the speed command signal Sc. In the present embodiment, the resolution information 301 includes information 303 on the number of inflection points provided at constant intervals on the speed curve (hereinafter also referred to as an inflection point number). The rotational speed information 302 is information including rotational speed values at the respective inflection points. For example, the rotational speed information 302 is data pairs in which inflection point sequence numbers m assigned to the respective inflection points based on the inflection point number 303 specified by the resolution information 301 and rotational speed values are associated with each other.

The storage unit 26 is configured to be capable of rewriting the parameter information 300. For example, the storage unit 26 is realized by a storage region of a rewritable non-volatile memory such as a flash memory mounted to the program processing device as the motor control circuit 11, and the parameter information 300 is stored in that storage region. As described above, the parameter information 300 stored in the storage unit 26 is rewritable by the host device 4 and another information processing device (e.g., a PC) performing communication with the motor control circuit 11 via the communication unit 20.

The speed command analyzing unit 24 is a functional unit for receiving a speed command signal Sc (PWM signal) indicating the target rotational speed of the motor 50 to be driven by a duty cycle from the outside (the host device 4) and analyzing the received speed command signal Sc. The speed command analyzing unit 24 measures the duty cycle of the speed command signal Sc with a resolution specified by the resolution information 301 included in the parameter information 300, and outputs the measured value.

Specifically, the speed command analyzing unit 24 measures the duty cycle of the speed command signal Sc with a resolution based on the inflection point number (number of inflection points) m as the resolution information 301, and outputs the measurement result. For example, when inflection point number m=50, the duty cycle of the speed command signal Sc is measured with a resolution (unit) of 2% (=duty cycle range/resolution=(100%-0%)/50). For example, when a speed command signal Sc having a duty cycle of 1% is input, the speed command analyzing unit 24 outputs "0%" as the measured value of the duty cycle of the speed command signal Sc, and when a speed command signal Sc having a duty cycle of 3% is input, the speed command analyzing unit 24 outputs "2%" as the measured value of the duty cycle of the speed command signal Sc. Thus, the speed command analyzing unit 24 analyzes the duty cycle of the speed command signal Sc with the resolution based on the number of inflection points.

The target rotational speed determining unit 25 determines the target rotational speed based on the parameter information 300 stored in the storage unit 26 and the result of measurement of the duty cycle of the speed command signal Sc by the speed command analyzing unit 24. Specifically, the target rotational speed determining unit 25 sets an inflection point In for each duty cycle obtained by equally dividing the possible duty cycle range (e.g., 0% to 100%) assumed by the speed command signal Sc by the resolution based on the resolution information 301 (the inflection point number m), calculates a rotational speed corresponding to the duty cycle of the speed command signal Sc measured by the speed command analyzing unit 24 based on the set inflection points In and the rotational speed information 302, and determines the calculated rotational speed as the target rotational speed.

In the present embodiment, although the inflection point is a point at which the slope of the speed curve can be changed as described above, the slope may not necessarily be changed at an inflection point. For example, although the slope of the speed curve does not change at a point 202 (where the duty cycle is 30%) on the speed curve 201 shown in FIG. 2A, the point 202 is also set as an inflection point in the present embodiment. That is, in the present embodiment, whether the slope changes at each inflection point depends on the rotational speed value that can be set arbitrarily by the rotational speed information 302.

Next, the specific processing flow of calculating the target rotational speed will be described.

Here, in a manner similar to the case of FIGS. 2A and 2B, description will be made by using an example in which the possible duty cycle range assumed by the speed command signal Sc is 0% to 100%, the inflection point number (number of inflection points In) m as the resolution information 301 is set to "50", and predetermined rotational speed values as shown in FIGS. 2A and 2B are set for the 50 respective inflection points In as the rotational speed information 302.

Figure 3:
FIG. 3 is a table for illustrating a method of calculating a target rotational speed by a motor control circuit according to embodiment 1.
Figure 4:
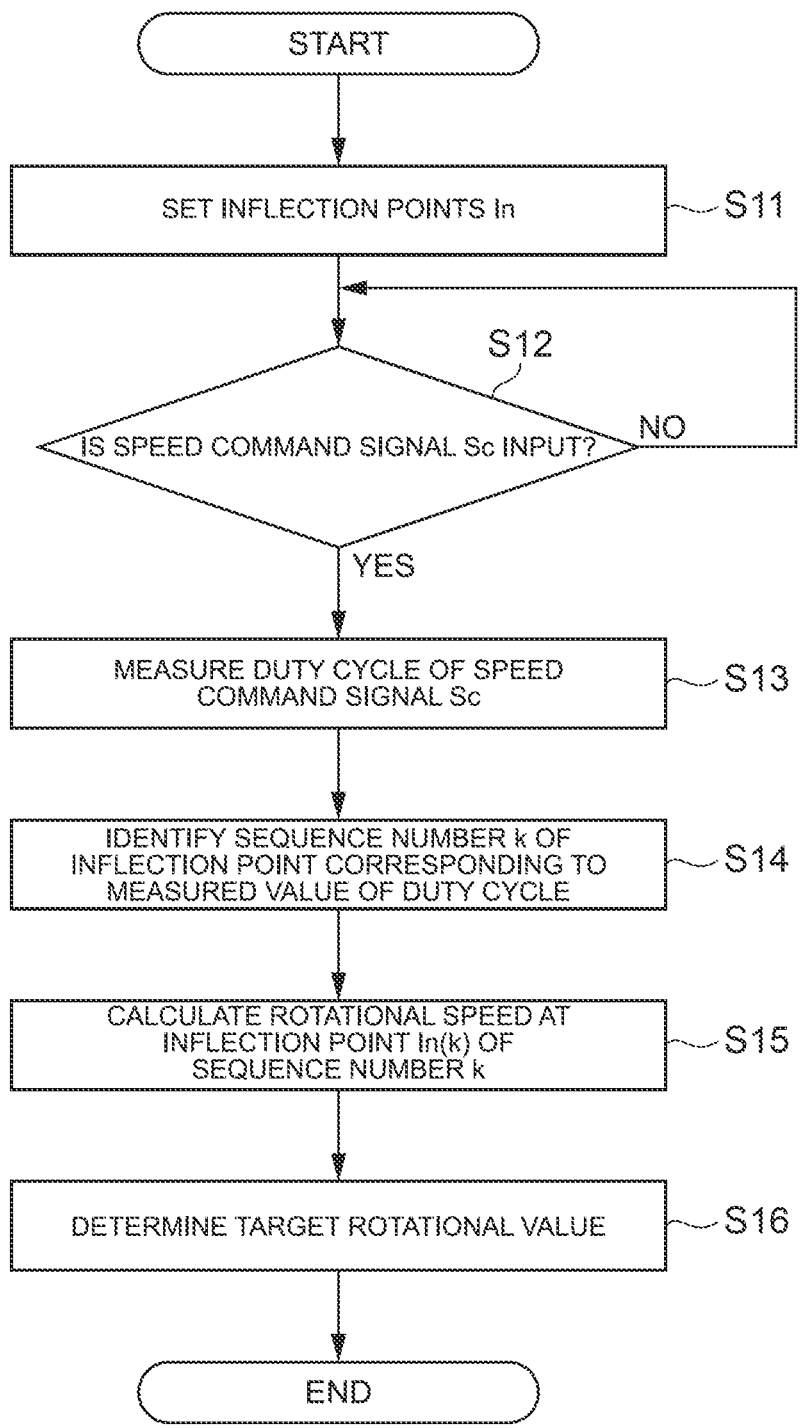
FIG. 4 is a flow chart showing an example of the processing flow of the method of calculating the target rotational speed by the motor control circuit according to embodiment 1.

FIG. 3 is a table for illustrating a method of calculating the target rotational speed by the motor control circuit 11 according to embodiment 1. FIG. 4 is a flow chart showing an example of the processing flow of the method of calculating the target rotational speed by the motor control circuit 11 according to embodiment 1.

For example, after the motor control circuit 11 is started, the target rotational speed determining unit 25 reads the parameter information 300 from the storage unit 26 to perform initial setting. Specifically, first, the target rotational speed determining unit 25 sets inflection points In at constant intervals in a possible duty cycle range (0% to 100%) assumed by the speed command signal Sc based on the resolution information 301 (inflection point number 303) and the rotational speed information 302 stored in the storage unit 26 (step S11). Specifically, the target rotational speed determining unit 25 sets an inflection points In for each duty cycle obtained by equally dividing the possible duty cycle range (0% to 100%) assumed by the speed command signal Sc based on the inflection point number m.

In the case of the above-described example, since m=50 is set as the inflection point number 303, as shown in FIGS. 2B and 3, the target rotational speed determining unit 25 sets an inflection point In for each 2% (=duty cycle range/inflection point number=(100%−0%)/50) in a duty cycle range of 0% to 100%, and assigns sequence numbers m of 0 to 50 to the respective inflection points In.

Thereafter, the motor control circuit 11 determines whether a PWM signal as a speed command signal Sc is input to the motor control circuit 11 from the outside (the host device 4) (step S12). When no speed command signal Sc is input (step S12: NO), the motor control circuit 11 waits until the speed command signal Sc is input.

When the speed command signal Sc is input (step S12: YES), the speed command analyzing unit 24 measures the duty cycle of the speed command signal Sc (step S13). Specifically, the speed command analyzing unit 24 measures the duty cycle of the speed command signal Sc with a resolution specified by the resolution information 301 (inflection point number 303) stored in the storage unit 26. For example, in the case of the above-described example, since the number of inflection points is set to "50" by the resolution information 301, the duty cycle of the speed command signal Sc is measured with a resolution (unit) of 2% (=(100%−0%)/50) in the possible duty cycle range of 0% to 100% assumed by the speed command signal Sc. Here, it is assumed that the measured value of the duty cycle of the input speed command signal Sc is 6%.

Thereafter, the target rotational speed determining unit 25 calculates a rotational speed corresponding to the duty cycle of the speed command signal Sc measured by the speed command analyzing unit 24 based on the set inflection points In and the rotational speed information 302. Specifically, first, the target rotational speed determining unit 25 identifies a sequence number k of an inflection point In corresponding to the measured value of the duty cycle acquired in step S11 from among the set inflection points In (step S14). In the case of the above-described example, since the duty cycle of the speed command signal Sc measured in step S12 is "6%", the target rotational speed determining unit 25 determines the sequence number k of the inflection point corresponding to the input speed command signal Sc as sequence number "3" corresponding to duty cycle=6% (k=3), as shown in FIG. 3.

Thereafter, the target rotational speed determining unit 25 calculates the rotational speed at the inflection point In(k) of the sequence number k identified in step S14 (step S15). In the case of the above-described example, the target rotational speed determining unit 25 reads, from the rotational speed information 302, a rotational speed value "1520" at the inflection point of sequence number k=3 identified in step S14, as shown in FIG. 3.

The target rotational speed determining unit 25 then determines the rotational speed acquired in step S13 as the target rotational speed (step S16). In the case of the above-described example, the target rotational speed determining unit 25 provides the rotational speed value "1520" acquired in step S15 as the target rotational speed to the drive control signal generating unit 14.

In the above-described processing procedure, the target rotational speed is calculated from the speed command signal Sc.

As above, the motor control circuit 11 according to embodiment 1 stores, as the parameter information 300 for defining the speed curve indicating the relationship between the duty cycle of the speed command signal Sc and the target rotational speed of the motor 50, the resolution information 301 indicating the resolution of the duty cycle of the speed command signal Sc and the rotational speed information 302 indicating rotational speeds at inflection points In(k) on the speed curve. The motor control circuit 11 sets an inflection point In(k) for each duty cycle obtained by equally dividing a possible duty cycle range assumed by the speed command signal Sc based on the resolution information 301, calculates a rotational speed corresponding to a measurement result of the duty cycle of the input speed command signal Sc based on the set inflection points In(k) and the rotational speed information 302, and determines the calculated rotational speed as the target rotational speed.

In this manner, by a user arbitrarily setting the resolution of the duty cycle of the speed command signal Sc specified by the resolution information 301 and the rotational speed values at the inflection points In arranged at constant intervals based on the resolution, the speed curve can be set with a high degree of flexibility.

Specifically, the motor control circuit 11 stores information on the inflection point number (number of inflection points In) m (inflection point number 303) provided at constant intervals on the speed curve as the resolution information 301, and measures the duty cycle of the speed command signal Sc with a resolution based on the inflection point number m. The motor control circuit 11 then identifies an inflection point In(k) corresponding to the measured duty cycle of the speed command signal Sc from among the set inflection points In, calculates the rotational speed at the identified inflection point In(k) based on the rotational speed information 302, and determines the calculated rotational speed as the target rotational speed.

Thus, with the motor control circuit 11 according to embodiment 1, it is possible to automatically set inflection points at constant intervals and assign desired rotational speeds to the respective inflection points only by storing information on the resolution (inflection point sequence number) of the duty cycle of the speed command signal and information on rotational speeds at the respective inflection points. In this manner, it is possible to easily set a speed curve with a high degree of flexibility as compared to the case where inflection point data including sets of duty cycle values of the speed command signal and rotational speed values is stored in advance as in a conventional method of setting a speed curve.

In addition, with the motor control circuit 11 according to embodiment 1, since the duty cycle values at the respective inflection points are calculated based on the resolution information 301 (inflection point sequence number), it is unnecessary to store in advance information on the duty cycles at the respective inflection points, and it is possible to reduce the capacity of a rewritable non-volatile memory such as a flash memory mounted on the motor control circuit 11. In this manner, it is possible to reduce the cost of the motor control circuit 11.

In addition, since the motor control circuit 11 measures the duty cycle of the speed command signal Sc with a resolution according to the number of inflection points and determines the target rotational speed by reading the rotational speed at the inflection point corresponding to the measured value of the duty cycle of the speed command signal Sc from the rotational speed information 302, instead of actually deriving a function representing a speed curve and calculating the target rotational speed by using the function as in a conventional method, complex computation is unnecessary, and the processing load of the CPU can be reduced.

Embodiment 2

Figure 5:
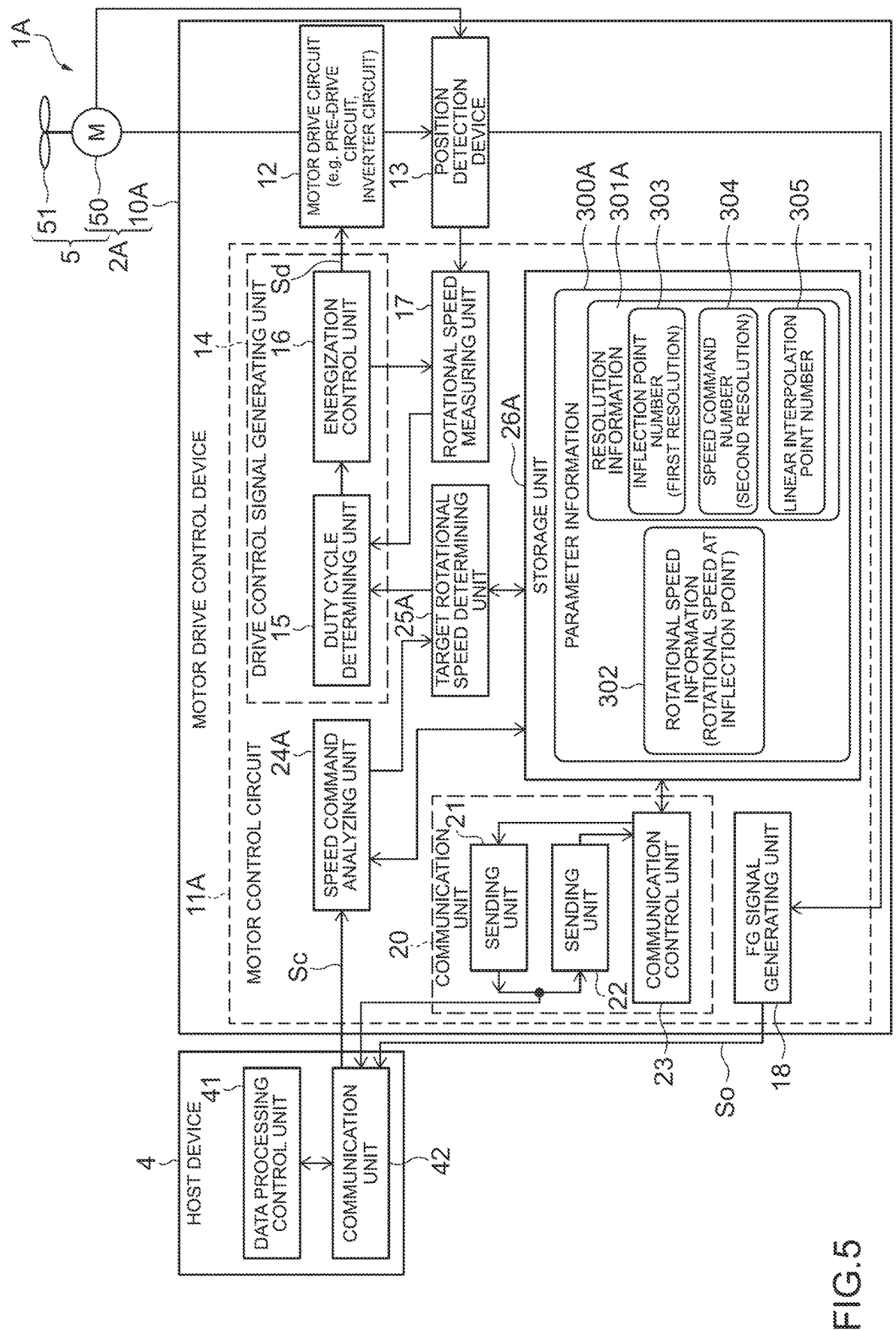
FIG. 5 is a diagram showing an example of the configuration of a motor drive control device according to embodiment 2.

FIG. 5 is a diagram showing an example of the configuration of a motor drive control device 10A according to embodiment 2.

The motor drive control device 10A according to embodiment 2 differs from the motor drive control device 10 according to embodiment 1 in that it has a function of calculating a target rotational speed according to a speed curve interpolated by straight lines between inflection points In, and is similar to the motor drive control device 10 according to embodiment 1 in the other points.

A motor control circuit 11A according to embodiment 2 sets inflection points at constant intervals in a possible duty cycle range (e.g., 0% to 100%) assumed by the speed command signal Sc, and calculates a target rotational speed according to a speed curve in which linear interpolation points Cr for interpolation with straight lines between the inflection points In are set at constant intervals between the inflection points In.

Figure 6:
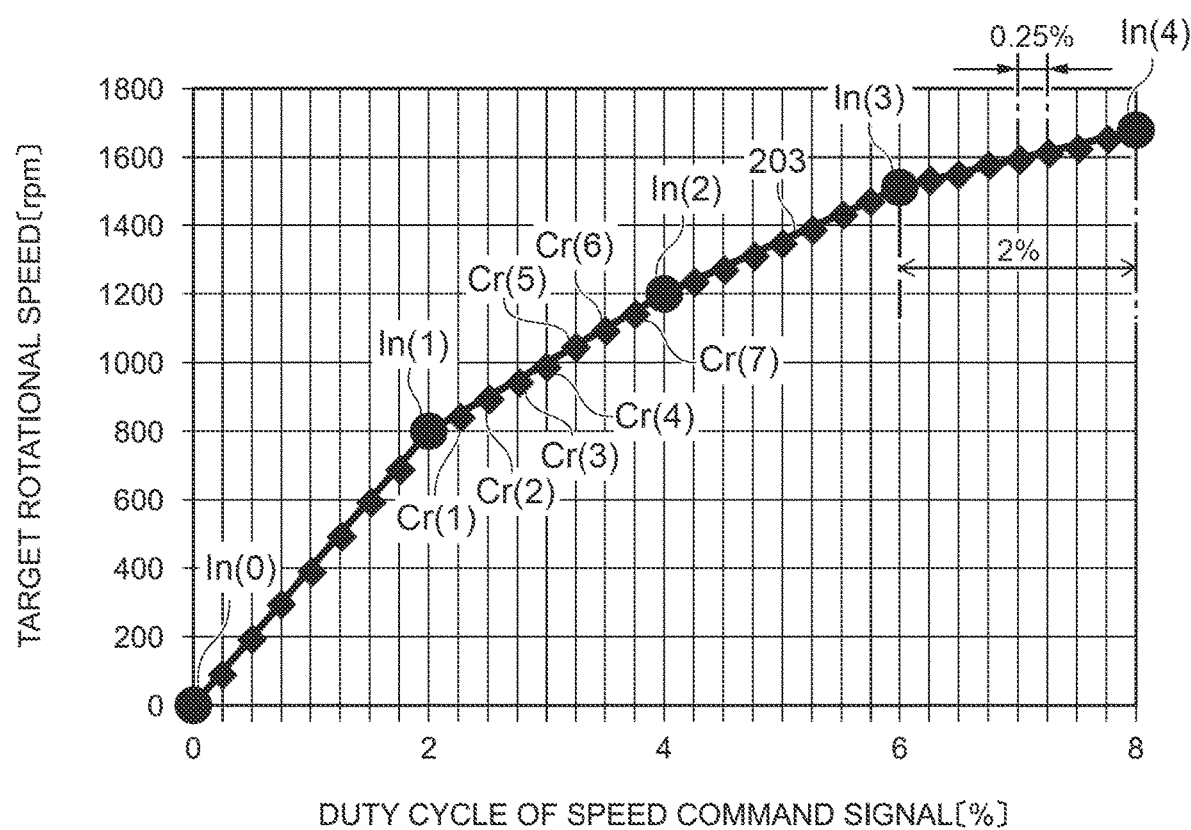
FIG. 6 is a graph for illustrating a method of calculating a target rotational speed according to embodiment 2.

FIG. 6 is a graph for illustrating a method of calculating the target rotational speed according to embodiment 2.

In FIG. 6, an example of a speed curve 203 indicating the relationship between the duty cycle of the speed command signal Sc and the target rotational speed according to embodiment 2 is shown. In FIG. 6, the vertical axis represents the target rotational speed [rpm], and the horizontal axis represents the duty cycle [%] of the speed command signal Sc.

In the speed curve 203 shown in FIG. 6, in a manner similar to the speed curve 201 shown in FIG. 2A, the number of inflection points in a possible duty cycle range assumed by the PWM signal as the speed command signal Sc (0% to 100% in the present example) is "50", an inflection point In is set for each 2% (=duty cycle range/inflection point number=(100%−0%)/50), and predetermined rotational speeds are assigned to the respective inflection points In. In addition, in a manner similar to the speed curve 201, the speed curve 203 is set such that the rate (slope) of change in the rotational speed relative to the duty cycle of the speed command signal Sc changes in a section where the duty cycle is between 0% and 10% and a section where the duty cycle is between 80% and 100%. In addition, on the speed curve 203, q (=7) linear interpolation points Cr(1) to Cr(7) are set at constant intervals between adjacent inflection points In.

Note that, in FIG. 6, in a manner similar to FIG. 2B, the range where the duty cycle of the speed command signal Sc on the speed curve 203 is between 0% and 8% is shown in an enlarged scale.

The motor control circuit 11A uses the inflection point number m as a first resolution, rotational speed values set for the respective inflection points, and a speed command number p (p≥m) as a second resolution higher than the first resolution for defining the speed curve 203 as shown in FIG. 6.

The motor control circuit 11A measures the duty cycle of the input speed command signal Sc with the speed command number p, and identifies the sequence number of a speed command corresponding to the measured duty cycle of the speed command signal Sc. The motor control circuit 11A calculates the difference in rotational speed between an inflection point present immediately prior to the speed command of the identified sequence number and an inflection point present immediately subsequent to the speed command of the identified sequence number.

The motor control circuit 11A calculates, based on a linear interpolation point number q based on the first resolution (inflection point number m) and the second resolution (speed command number p) and the calculated difference in rotational speed between the two inflection points In, an increase in rotational speed between linear interpolation points Cr present between the two inflection points In.

The motor control circuit 11A calculates a rotational speed corresponding to the identified sequence number of the speed command signal Sc based on the identified sequence number of the speed command signal Sc, the linear interpolation point number q, and the increase in rotational speed between the linear interpolation points Cr, and determines the calculated rotational speed as the target rotational speed.

Hereinafter, the method of determining the target rotational speed by the motor control circuit 11A will be specifically described.

As shown in FIG. 5, the motor control circuit 11A includes a speed command analyzing unit 24A, a storage unit 26A, and a target rotational speed determining unit 25A as functional units for determining the target rotational speed of the motor 50.

In a manner similar to the storage unit 26 according to embodiment 1, the storage unit 26A stores parameter information 300A required for calculating the target rotational speed of the motor 50 based on the speed command signal Sc.

The parameter information 300A includes rotational speed information 302 and resolution information 301A. The resolution information 301A includes an inflection point number 303 as a first resolution, a speed command number 304 as a second resolution, and a linear interpolation point number 305. Note that it is only required that at least two pieces of information out of the inflection point number 303, the speed command number 304, and the linear interpolation point number 305 is stored in advance as the resolution information 301A in the storage unit 26A, and the remaining information can be calculated from the other two pieces of information.

The inflection point number 303 is an inflection point number (the number of inflection points In) m to be set in a possible duty cycle range (e.g., 0% to 100%) assumed by the speed command signal Sc, in a manner similar to embodiment 1.

The speed command number 304 is a value (also referred to as a speed command number p) indicating the resolution of the duty cycle of the speed command signal Sc. In other words, the speed command number 304 ($p$) represents the total number of speed commands identified by the duty cycle of the speed command signal Sc. As will be described later, a sequence number is assigned to each speed command according to the speed command number p. The speed command number p is a value greater than or equal to the inflection point number m as the first resolution.

The linear interpolation point number 305 is the number of linear interpolation points Cr (also referred to as a linear interpolation point number q) provided at constant intervals between adjacent inflection points In for interpolation with straight lines between the inflection points In. It is preferable to set the linear interpolation point number q to a value smaller by 1 than a power of 2. For example, assuming that n is an integer larger than or equal to 1, the linear interpolation point number q is $q=(2^n-1)$.

FIG. 7 is a table showing an example of the mutual relationship between the speed command number, the linear interpolation point number, and the inflection point number. In FIG. 7, a numerical value example of the linear interpolation point number q ($=2^n-1$) and the inflection points m when the resolution of the duty cycle of the speed command signal Sc (the speed command number p) is 256, 400, and 512.

As shown in FIG. 7, there is a correlation between the speed command number p, the inflection point number m, and the linear interpolation point number q, and when two values out of the speed command number p and the inflection point number m, and the linear interpolation point number q are determined, the other one value is also determined. For example, when the speed command number (array number of speed commands) p=400 and the array number of inflection points (inflection point number) m=50, the linear interpolation point number q=7 (=speed command number/inflection point number=(400/50)−1). In addition, for example, when the speed command number (array number of speed commands) p=256 and the linear interpolation point number q=24−1=15, the inflection point number m=speed command number/(linear interpolation point number+1)=256/(15+1)=16.

In the present embodiment, as an example, description will be made by assuming that the two pieces of information of the inflection point number 303 and the speed command number 304 are stored in advance as the resolution information 301A in the storage unit 26A.

For example, in a manner similar to the storage unit 26, the storage unit 26A is realized by a storage region of a rewritable non-volatile memory such as a flash memory mounted on the program processing device as the motor control circuit 11A, and the parameter information 300A is stored in that storage region. The parameter information 300A stored in the storage unit 26A is rewritable by the host device 4 and another information processing device (e.g., a PC) performing communication with the motor control circuit 11A via the communication unit 20.

The speed command analyzing unit 24A measures the duty cycle of the speed command signal Sc with the speed command number p (second resolution) specified by the resolution information 301A and outputs the measured value. Specifically, the speed command analyzing unit 24A measures the duty cycle of the speed command signal Sc with the second resolution based on the speed command number p and outputs the measurement result. For example, as shown in FIG. 7, when the speed command number p=256, the speed command analyzing unit 24A measures the duty cycle of the speed command signal Sc with a resolution (unit) of 0.391% (=duty cycle range/speed command number=(100%−0%)/256).

The target rotational speed determining unit 25A determines the target rotational speed based on the parameter information 300A stored in the storage unit 26A and the result of measurement of the duty cycle of the speed command signal Sc by the speed command analyzing unit 24A.

The target rotational speed determining unit 25A defines a speed curve as shown in FIG. 6 based on inflection points In provided at constant intervals in a possible duty cycle range (e.g., 0% to 100%) assumed by the PWM signal as the speed command signal Sc and linear interpolation points Cr provided at constant intervals between the inflection points In, and determines the target rotational speed according to the speed curve.

Figure 9:
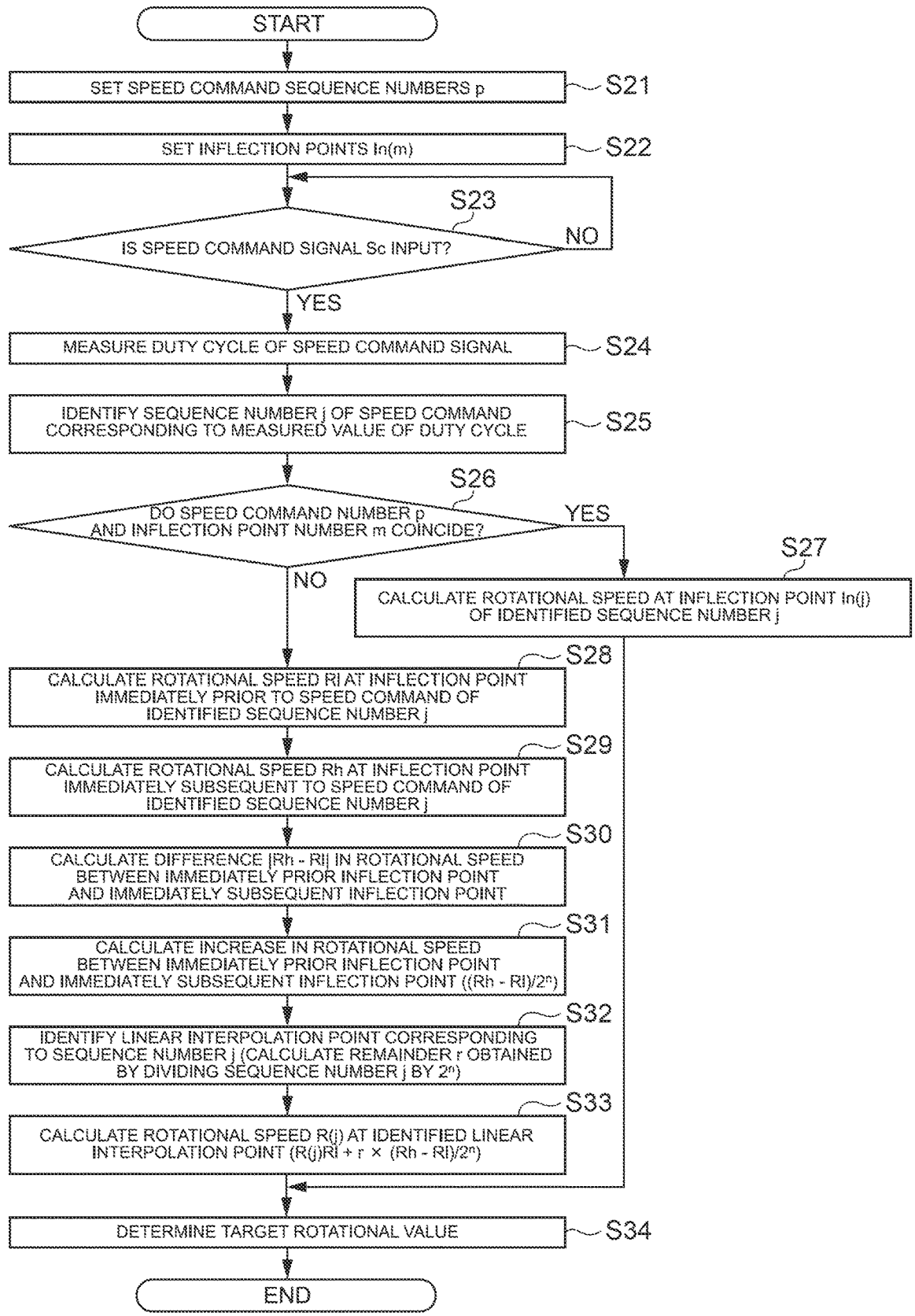
FIG. 9 is a flow chart showing an example of the processing flow of the method of calculating the target rotational speed by the motor control circuit according to embodiment 2.

Hereinafter, the specific processing flow of calculating the target rotational speed by the target rotational speed determining unit 25A will be described by using FIGS. 8 and 9.

FIG. 8 is a table for illustrating a method of calculating the target rotational speed by the motor control circuit 11A according to embodiment 2. FIG. 9 is a flow chart showing an example of the processing flow of the method of calculating the target rotational speed by the motor control circuit 11A according to embodiment 2.

Here, description will be made by using an example in which the possible duty cycle range assumed by the speed command signal Sc is 0% to 100%, the number of inflection points In (inflection point number m) as the inflection point number 303 is set to "50", predetermined rotational speed values as shown in FIG. 6 are set for the 50 respective inflection points In as the rotational speed information 302, and the value of the second resolution (speed command number) p of the duty cycle as the speed command number 304 is set to "400".

For example, after the motor control circuit 11A is started, the target rotational speed determining unit 25A reads the parameter information 300A from the storage unit 26A to perform initial setting. Specifically, first, the target rotational speed determining unit 25A sets a speed command sequence number for each duty cycle obtained by equally dividing the possible duty cycle range assumed by the speed command signal Sc based on the speed command number 304($p$) as the second resolution (step S21). For example, in the case of the above-described example, since the second resolution (speed command number p) is set to "400" by the speed command number 304, as shown in FIG. 8, sequence numbers p of 0 to 400 are assigned to the respective speed commands for each 0.25% (=duty cycle range/speed command number=(100%−0%)/400), obtained by equally dividing the duty cycles of 0 to 100% by "400".

Thereafter, in a manner similar to embodiment 1, the target rotational speed determining unit 25A sets inflection points In(m) at constant intervals in the possible duty cycle range (0% to 100%) assumed by the speed command signal Sc based on the resolution information 301A (inflection point number 303) and the rotational speed information 302 stored in the storage unit 26A (step S22). Specifically, the target rotational speed determining unit 25A sets an inflection point In for each duty cycle obtained by equally dividing the possible duty cycle range (0% to 100%) assumed by the speed command signal Sc based on the inflection point number m as the first resolution.

In the case of the above-described example, since the value of the first resolution m indicating the inflection point number 303 is set to "50", as shown in FIGS. 6 and 8, the target rotational speed determining unit 25A sets an inflection point In for each 2% (duty cycle range/inflection point number=(100%−0%)/50) in a duty cycle range of 0% to 100%, and assigns sequence numbers m (m is an integer larger than or equal to 0) to the respective inflection points In.

Thereafter, it is determined whether a PWM signal as a speed command signal Sc is input to the motor control circuit 11A from the outside (the host device 4) (step S23). When no speed command signal Sc is input (step S23: NO), the motor control circuit 11A waits until the speed command signal Sc is input.

When the speed command signal Sc is input (step S23: YES), the speed command analyzing unit 24A measures the duty cycle of the speed command signal Sc (step S24). Specifically, the speed command analyzing unit 24A measures the duty cycle of the speed command signal Sc with the speed command number (second resolution) p specified by the resolution information 301A (speed command number 304) stored in the storage unit 26A. For example, in the case of the above-described example, since the speed command number p is set to "400" by the speed command number 304, the duty cycle of the speed command signal Sc is measured with a resolution of 0.25% (=duty cycle range/speed command number=(100%−0%)/400). Here, it is assumed that the measured value of the duty cycle of the input speed command signal Sc is "3%".

Thereafter, the target rotational speed determining unit 25A identifies a speed command sequence number j corresponding to the measured value of the duty cycle acquired in step S24 from among the speed command sequence numbers set in step S21 (step S25). In the case of the above-described example, since the duty cycle of the speed command signal Sc measured in step S24 is "3%", the target rotational speed determining unit 25A determines the speed command sequence number j corresponding to the input speed command signal Sc as sequence number "12" corresponding to duty cycle=3% (j=12), as shown in FIG. 8.

Thereafter, the target rotational speed determining unit 25A determines whether the speed command number p and the inflection point number m coincide (step S26). When p=m (step S26: Yes), the speed command sequence number and the inflection point sequence number coincide, and thus the speed command of the sequence number j identified in step S25 indicates a certain inflection point In. Therefore, in this case, in a manner similar to embodiment 1, the target rotational speed determining unit 25A identifies an inflection point In(j) of a sequence number m coinciding with the speed command sequence number j identified in step S25, and acquires a rotational speed value at the identified inflection point In(j) from the rotational speed information 302 (step S27). The target rotational speed determining unit 25A then determines the rotational speed acquired in step S27 as the target rotational speed (step S34). Note that, in the case of the above-described example, since p≠m (the speed command number p and the inflection point number m do not coincide), the process of step S27 is not performed.

On the other hand, when p≠m (the speed command number p and the inflection point number m do not coincide) (step S26: NO), the target rotational speed determining unit 25A calculates a rotational speed Rl at an inflection point In present immediately prior to the speed command of the speed command sequence number j identified in step S25 (step S28). For example, in the case of the above-described example, as shown in FIG. 8, the target rotational speed determining unit 25A reads, from the rotational speed information 302, rotational speed "800" at inflection point In(1) present immediately prior to the speed command of sequence number j=12 identified in step S25.

Thereafter, the target rotational speed determining unit 25A calculates a rotational speed Rh at an inflection point In present immediately subsequent to the speed command of the sequence number j identified in step S25 (step S29). For example, in the case of the above-described example, the target rotational speed determining unit 25A reads, from the rotational speed information 302, rotational speed "1200" at inflection point In(2) present immediately subsequent to the speed command of sequence number j=12 identified in step S25.

Thereafter, the target rotational speed determining unit 25A calculates the difference between the rotational speed at the inflection point In present immediately prior to the speed command of the sequence number j calculated in step S28 and the rotational speed at the inflection point In immediately subsequent to the speed command of the sequence number j calculated in step S29 (step S30). In the case of the above-described example, since the rotational speed at inflection point In(1) immediately prior to the speed command of the sequence number j is "800" and the rotational speed at inflection point In(2) immediately subsequent to the speed command of the sequence number j is "1200", the difference in rotational speed between inflection point In(1) and inflection point In(2), |Rh−Rl|, is "400".

Thereafter, the target rotational speed determining unit 25A calculates an increase in rotational speed between linear interpolation points Cr set between the inflection point In immediately prior to the speed command of the sequence number j and the inflection point In immediately subsequent to the speed command of the sequence number j (step S31). Specifically, the target rotational speed determining unit 25A divides the difference in rotational speed between inflection point In(1) and inflection point In(2), |Rh−Rl|, calculated in step S30, by a value equal to the linear interpolation point number q plus 1 ($=2^n$) to calculate a unitary increase in rotational speed between the linear interpolation points Cr. In the case of the above-described example, since the difference in rotational speed |Rh−Rl| calculated in step S30 is "400" and linear interpolation point number $q=7(2^3−1)$, the increase in rotational speed between the linear interpolation points Cr between inflection point In(1) immediately prior to the speed command of sequence number j=12 and inflection point In(2) immediately subsequent to the speed command of sequence number j=12 is $400/2^3=50$.

At this time, the value equal to the linear interpolation point number q plus 1 ($=2^n$) is calculated as follows. For example, if the inflection point number 303 and the speed command number 304 are stored in advance as the resolution information 301A in the storage unit 26A, the target rotational speed determining unit 25A calculates the value equal to the linear interpolation point number q plus 1 ($2^n=8$) by dividing the speed command number 304 (p=400) by the inflection point number 303 (m=50). On the other hand, if the linear interpolation point number q is stored as the resolution information 301A in the storage unit 26A, the stored value can be used.

Thereafter, the target rotational speed determining unit 25A identifies which linear interpolation point Cr the speed command of the sequence number j identified in step S25 coincide with from among the linear interpolation points Cr present between inflection point In(1) immediately prior to the speed command of the sequence number j and inflection point In(2) immediately subsequent to the speed command of the sequence number k (step S32).

Specifically, the target rotational speed determining unit 25A divides the sequence number j identified in step S25 by the value equal to the linear interpolation point number q plus 1 ($2^n=8$) to calculate the remainder r. In the case of the above-described example, since the sequence number j identified in step S25 is equal to 12 and the linear interpolation point number $q=7(2^3−1)$, the remainder r=4 is calculated by dividing 12 by $8(=2^3)$. In this manner, the target rotational speed determining unit 25A determines that the speed command of sequence number j=12 identified in step S25 corresponds to the "4th" linear interpolation point Cr from inflection point In(1) as shown in FIG. 8.

Thereafter, the target rotational speed determining unit 25A calculates a rotational speed Rj at a linear interpolation point Cr corresponding to the speed command of the sequence number j identified in step S32 (step S33). For example, the target rotational speed determining unit 25A adds the rotational speed Rl at inflection point In(1) immediately prior to the speed command of the sequence number j identified in step S28 to the value obtained by multiplying the increase in rotational speed calculated in step S31 by the remainder r calculated in step S32, to calculate the rotational speed Rj corresponding to the speed command of the sequence number j identified in step S25 (R(j)=Rl+r×|Rh−Rl|/$2^n$). In the case of the above-described example, rotational speed R(j) of sequence number j=12 is equal to 800+4×(1200−800)/8=1000.

The target rotational speed determining unit 25A then determines the rotational speed Rj calculated in step S33 as the target rotational speed (step S34).

In the above-described processing procedure, the target rotational speed is calculated from the speed command signal Sc.

As above, the motor control circuit 11A according to embodiment 2, as described above, stores in advance at least two pieces of information out of the inflection point number 303 as the first resolution of the duty cycle of the speed command signal Sc, the speed command number 304 indicating the second resolution of the duty cycle of the speed command signal Sc, the second resolution being higher than the first resolution, and information on the linear interpolation point number 305 provided at constant intervals between adjacent inflection points In for interpolation with straight lines between the inflection points In, as the resolution information 301A.

As described above, the motor control circuit 11A sets an inflection point In for each duty cycle obtained by equally dividing the possible duty cycle range (e.g., 0% to 100%) assumed by the speed command signal Sc based on the inflection point number 303(m). The motor control circuit 11A sets a speed command sequence number p for each duty cycle obtained by equally dividing the possible duty cycle range (e.g., 0% to 100%) assumed by the speed command signal Sc based on the speed command number 304 (p) as the second resolution. The motor control circuit 11A identifies the sequence number j corresponding to a measurement result of the duty cycle of the input speed command signal Sc from among the set sequence numbers p.

As described above, the motor control circuit 11A then calculates, based on the difference between the rotational speed at the inflection point immediately prior to the speed command of the identified sequence number j and the rotational speed at the inflection point immediately subsequent to the speed command of the identified sequence number j, |Rh−Rl|, an increase in rotational speed between linear interpolation points Cr present between the immediately prior inflection point and the immediately subsequent inflection point, calculates the rotational speed Rj corresponding to the speed command of the identified sequence number j based on the calculated increase and the linear interpolation point number (number of linear interpolation points) q, and determines the calculated rotational speed Rj as the target rotational speed.

Thus, with the motor control circuit 11A according to embodiment 2, linear interpolation can be performed between the inflection points In, and thus it is possible to define a speed curve with a higher degree of flexibility. For example, in a conventional method of setting a speed curve, the degree of flexibility of the speed curve can be increased by increasing the number of inflection points, but if the inflection points are simply increased, the calculation of the target speed becomes complex, and the processing speed of the processor may be decreased. In contrast, with the motor control circuit 11A according to embodiment 2, by providing linear interpolation points Cr between inflection points In, it is possible to increase the degree of flexibility of the speed curve without increasing the number of inflection points.

In addition, in the motor control circuit 11A according to embodiment 2, by setting the linear interpolation point number q to a number smaller by 1 than a power of 2, it is possible to calculate rotational speeds at the linear interpolation points Cr by shift operation instead of division as described above, and thus it is possible to adopt a low-cost microcontroller without a divider as the motor control circuit 11A and prevent decrease in processing speed due to the performing of division even with a low-cost microcontroller. In addition, reduction in ROM capacity can also be expected in some cases.

In addition, with the motor control circuit 11A according to embodiment 2, by storing in advance at least two pieces of data out of the inflection point number 303, the speed command number 304, and the linear interpolation point number 305 as the resolution information 301A, the remaining one piece of data can be calculated, and thus it is possible to reduce the amount of data to be stored in the microcontroller in advance. In this manner, it is possible to reduce the capacity of a non-volatile memory mounted on the microcontroller as the motor control circuit 11A, contributing cost reduction of the motor control circuit 11A.

<<Extension of Embodiments>>

Although the disclosure made by the present inventors has been specifically described above based on the embodiments, it is apparent that the present disclosure is not limited thereto and various modifications are possible without departing from the spirit thereof.

For example, although in the above-described embodiments, the case where the target rotational speed determining unit 25, 25A identifies the sequence number of a speed command or inflection point corresponding to the duty cycle of the speed command signal measured by the speed command analyzing unit 24, 24A is illustrated, there is no limitation thereto. For example, the speed command analyzing unit 24, 24A may identify the sequence number of a speed command or inflection point corresponding to the measured duty cycle of the speed command signal and provide the value of the identified sequence number to the target rotational speed determining unit 25, 25A.

In addition, although in embodiment 2, the inflection point number 303 and the speed command number 304 are illustrated as the information stored in advance as the resolution information 301A in the storage unit 26A and the case of calculating the linear interpolation point number 305 from the inflection point number 303 and the speed command number 304, there is no limitation thereto. For example, the motor control circuit 11A may store in advance the inflection point number 303 and the linear interpolation point number 305 in the storage unit 26A and calculate the speed command number 304 based on these two pieces of information, or store in advance the speed command number 304 and the linear interpolation point number 305 in the storage unit 26A and calculate the inflection point number 303 based on these two pieces of information.

In addition, the above-described flow charts are specific examples, and there is no limitation to these flow charts. For example, in the above-mentioned flow charts, the order of processes may be interchanged. In addition, in the above-mentioned flow charts, another process may be interposed between steps, or some processes may be parallelized.

The number of phases of the motor driven by the motor drive control device in the above-described embodiments is not limited to three phases. In addition, the number of Hall devices is not particularly limited.

The method of detecting the rotational speed of the motor is not particularly limited. For example, the rotational speed may be detected in a position sensor-less scheme in which the rotational speed is detected by using back electromotive force induced in the motor coils, without using a position detector such as a Hall device.

What is claimed is:

1. A motor control circuit comprising:
a speed command analyzing unit measuring a duty cycle of an input speed command signal indicating a target rotational speed of a motor to be driven;
a storage unit storing parameter information for defining a speed curve indicating a relationship between the duty cycle of the speed command signal and the target rotational speed;
a target rotational speed determining unit determining the target rotational speed based on the parameter information stored in the storage unit and a result of measurement of the duty cycle of the speed command signal by the speed command analyzing unit; and
a drive control signal generating unit generating a drive control signal for controlling driving of the motor based on the target rotational speed determined by the target rotational speed determining unit, wherein
the parameter information includes resolution information indicating a resolution of the duty cycle of the speed command signal and rotational speed information indicating a rotational speed at an inflection point on the speed curve, and
the target rotational speed determining unit sets the inflection point for each duty cycle obtained by equally dividing a possible duty cycle range assumed by the speed command signal based on the resolution information, calculates a rotational speed corresponding to the duty cycle of the speed command signal measured by the speed command analyzing unit based on the set inflection point and the rotational speed information, and determines the calculated rotational speed as the target rotational speed.

2. The motor control circuit according to claim 1, wherein the storage unit is configured to be capable of rewriting the parameter information.

3. The motor control circuit according to claim 1, wherein the resolution information includes information on a number of inflection points provided at constant intervals on the speed curve,
the speed command analyzing unit measures the duty cycle of the speed command signal with a resolution based on the number of inflection points, and
the target rotational speed determining unit identifies an inflection point corresponding to the duty cycle of the speed command signal measured by the speed command analyzing unit from among the set inflection points, calculates a rotational speed at the identified inflection point based on the rotational speed information, and determines the calculated rotational speed as the target rotational speed.

4. The motor control circuit according to claim 1, wherein the resolution information includes at least two of information on a number of inflection points as a first resolution of the duty cycle of the speed command signal, information on a speed command number as a second resolution of the duty cycle of the speed command signal, the second resolution being higher than the first resolution, and information on a number of linear interpolation points provided at constant intervals between the adjacent inflection points for interpolation between the inflection points with straight lines, the target rotational speed determining unit sets the inflection point for each duty cycle obtained by equally dividing a possible duty cycle range assumed by the speed command signal based on the number of inflection points and sets a speed command sequence number for each duty cycle obtained by equally dividing the possible duty cycle range assumed by the speed command signal based on the speed command number, and identifies the speed command sequence number corresponding to the duty cycle of the speed command signal measured by the speed command analyzing unit from among the set speed command sequence numbers, and the target rotational speed determining unit calculates an increase in rotational speed between the linear interpolation points present between the inflection point immediately prior to the identified speed command sequence number and the inflection point immediately subsequent to the identified speed command sequence number based on a difference between a rotational speed at the immediately prior inflection point and a rotational speed at the immediately subsequent inflection point, calculates a rotational speed corresponding to the identified speed command sequence number based on a value of the calculated increase in rotational speed between the linear interpolation points and the number of linear interpolation points, and determines the calculated rotational speed as the target rotational speed.

5. The motor control circuit according to claim 4, wherein the target rotational speed determining unit multiplies, by the increase in rotational speed between the linear interpolation points, a value of a remainder obtained by dividing the identified speed command sequence number by a number equal to the number of linear interpolation points plus 1, adds the rotational speed at the immediately prior inflection point to the value obtained by the multiplication, and determines the value obtained by the addition as the target rotational speed.

6. The motor control circuit according to claim 4, wherein when n is defined as an integer larger than or equal to 1, the number of linear interpolation points is $(2^n-1)$.

7. The motor control circuit according to claim 4, wherein the target rotational speed determining unit calculates the number of linear interpolation points based on the information on the number of inflection points and the information on the speed command number.

8. A motor drive control device comprising:
the motor control circuit according to claim 1; and
a motor drive circuit driving the motor based on the drive control signal generated by the motor control circuit.

9. A motor unit comprising:
the motor drive control device according to claim 8; and
the motor driven by the motor drive control device.

* * * * *